(12) United States Patent
Carlson et al.

(10) Patent No.: US 7,938,415 B2
(45) Date of Patent: May 10, 2011

(54) SUSPENDED AXLE FOR SPRAYER

(75) Inventors: Brandon C. Carlson, Ankeny, IA (US); Donald E. Young, Cedar Falls, IA (US); Garry E. Baxter, Ankeny, IA (US); Jack C. Anderson, Madrid, IA (US)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 12/045,107

(22) Filed: Mar. 10, 2008

(65) Prior Publication Data

US 2009/0224501 A1    Sep. 10, 2009

(51) Int. Cl.
B60G 9/02    (2006.01)
(52) U.S. Cl. .............................. 280/124.11; 280/124.116
(58) Field of Classification Search ............. 280/124.11, 280/124.116, 124.106, 124.128, 124.132, 280/124.153, 124.16, 124.156
See application file for complete search history.

(56) References Cited

U.S. PATENT DOCUMENTS

| | | | | |
|---|---|---|---|---|
| 2,746,766 | A * | 5/1956 | Nallinger | 280/124.179 |
| 4,406,479 | A * | 9/1983 | Chalmers | 280/678 |
| 5,458,359 | A * | 10/1995 | Brandt | 280/124.111 |
| 6,042,131 | A * | 3/2000 | Bailey | 280/86.75 |
| 6,270,282 | B1 * | 8/2001 | McLaughlin | 403/158 |
| 6,439,588 | B1 * | 8/2002 | Svensson | 280/124.116 |
| 2001/0035624 | A1 * | 11/2001 | Hickling | 280/124.169 |
| 2003/0214118 | A1 * | 11/2003 | Pavuk | 280/678 |
| 2006/0170176 | A1 | 8/2006 | Wubben et al. | |
| 2007/0138755 | A1 * | 6/2007 | Copsey et al. | 280/124.116 |

FOREIGN PATENT DOCUMENTS

| | | |
|---|---|---|
| DE | 43 38 651 | 3/1995 |
| EP | 0 728 601 | 9/1996 |
| EP | 1 769 950 | 4/2007 |
| FR | 2 842 462 | 7/2002 |
| JP | 08 156552 | 6/1996 |

OTHER PUBLICATIONS

EP1769950 Machine Translation obtained from the European Patent Office, Inventor: Desreumaux et al.*

* cited by examiner

*Primary Examiner* — Paul N. Dickson
*Assistant Examiner* — George D. Spisich

(57) ABSTRACT

A vehicle is provided with an axle suspended from a main frame of the vehicle by right- and left-hand pairs of connecting rods. As viewed from the top, one of each of the right- and left-hand pairs of connecting rods crosses the other of the pair of rods, and, as viewed from the side, the right- and left-hand pairs of rods are disposed parallel to each other. This arrangement of the connecting rods results in the axle moving substantially vertically up and down during operation of vehicle over uneven terrain.

5 Claims, 4 Drawing Sheets

SUSPENDED AXLE FOR SPRAYER

FIELD OF THE INVENTION

The present invention relates to vehicle suspensions, and more particularly relates to a suspension for a self-propelled agricultural sprayer.

BACKGROUND OF THE INVENTION

One known self-propelled sprayer is provided with a suspension arrangement having each of four drive wheels of the sprayer suspended independently, one each at opposite ends of front and rear axles that are fixed to the main frame of the sprayer. The suspension for each of the wheels includes a large complicated, machined casting fixed to one end of an associated axle and which works together with expensive chrome spindles which telescope within upright sleeves defined by the casting so as to permit relative motion between the wheel and the axle.

Another known self-propelled sprayer avoids the costs associated with the machined casting and chrome spindles by suspending the axles by the provision of a pair of connecting rods coupled between the vehicle main frame and each of opposite ends of the axle, and by providing a fifth connecting rod that serves as a lateral stabilizer bar. This suspension design suffers from the drawback that the axle swings in an arc about the attachment points of the lateral stabilizer bar creating tracking issues as the suspension goes up and down.

Accordingly, the problem to be solved is that of providing a wheel suspension for a self-propelled sprayer which overcomes the drawbacks associated with the prior art suspensions.

SUMMARY OF THE INVENTION

According to the present invention, there is provided a self-propelled agricultural sprayer having a axle suspension including a plurality of suspension rods.

An object of the invention is to provide a self-propelled agricultural sprayer having a relatively simple axle suspension including suspension rods robustly mounted in an arrangement for resulting in the opposite ends of the axle undergoing near vertical up and down motion as the sprayer vehicle travels over uneven ground.

The foregoing object is accomplished by suspending each end of the axle from a mounting bracket extending between, and fixed to, fore-and-aft extending, parallel beams of the vehicle frame by a pair of connecting rods arranged such that as viewed from the side, they extend parallel to each other, and as viewed from the top, one crosses the other.

The foregoing and other objects will become apparent from a reading of the ensuing description together with the appended drawings.

DESCRIPTION OF THE PREFERRED EMBODIMENT

Figure 1:
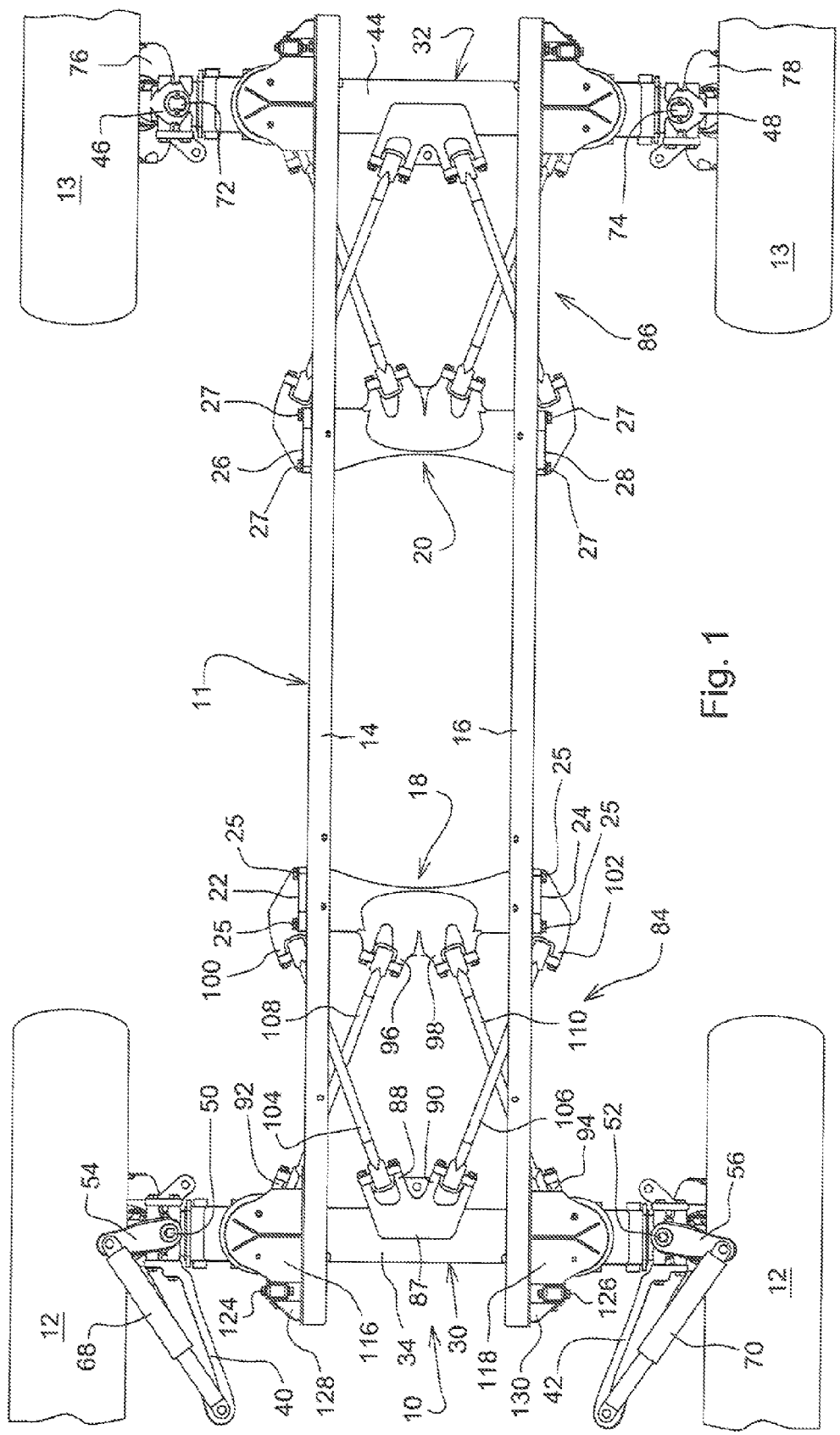
FIG. 1 is a top view of a sprayer vehicle frame with front and rear axles being suspended in accordance with the principles of the present invention.
Figure 2:
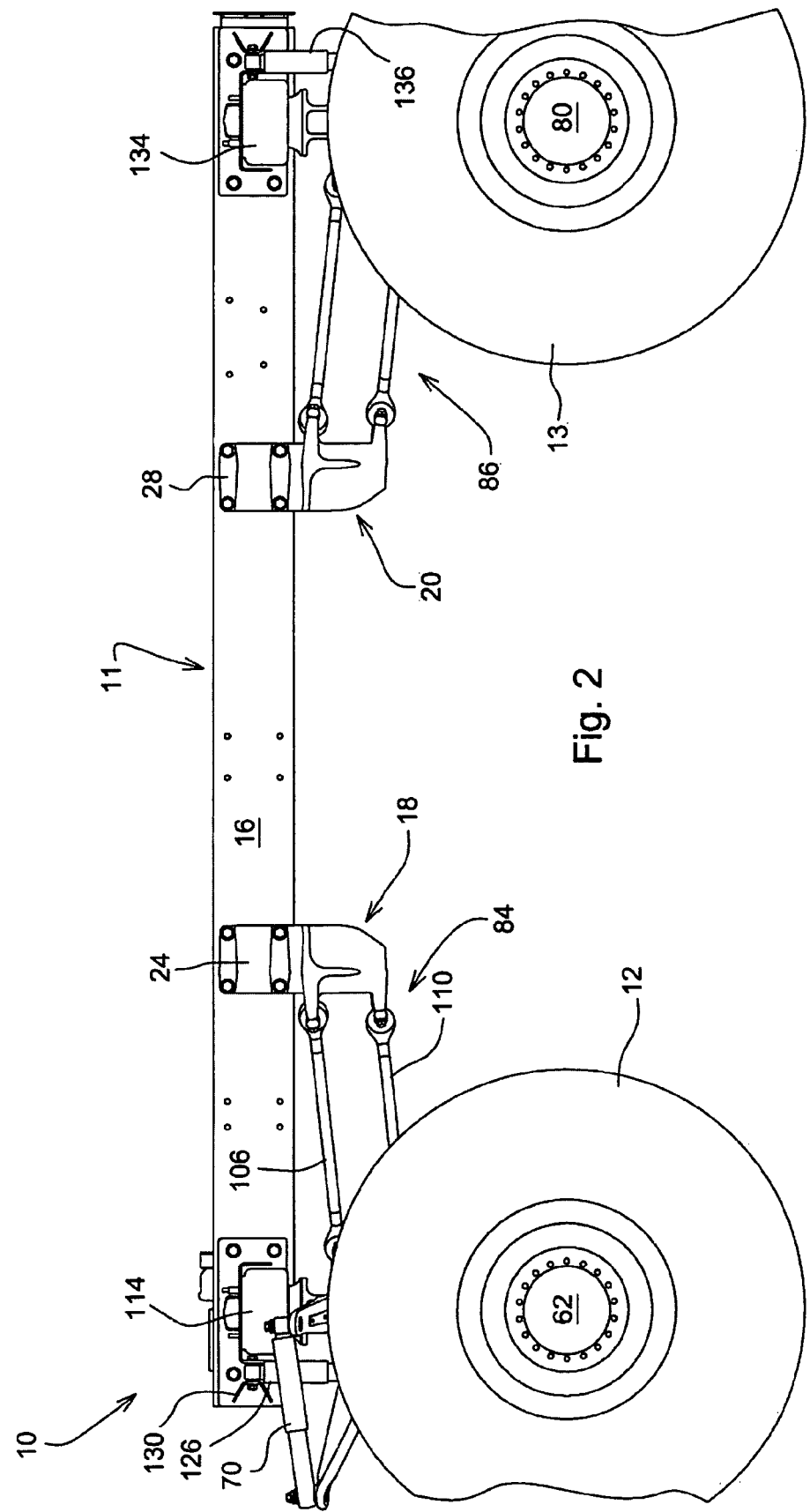
FIG. 2 is a left side view of the sprayer vehicle frame and axle suspensions shown in FIG. 1.

Referring now to FIGS. 1 and 2, there is shown a chassis 10 of a high clearance agricultural vehicle, such as a self-propelled agricultural field sprayer, including a main frame 11 supported on a front pair of driven, steerable ground wheels 12 and a rear pair of driven, non-steerable ground wheels 13.

The main frame 11 comprises transversely spaced, right- and left-hand, fore-and-aft extending parallel beams 14 and 16, respectively. The beams 14 and 16 are fixed relative to each other by cross members in the form of front and rear, generally U-shaped suspension rod mounting brackets 18 and 20, respectively. The front bracket 18 is spaced to the rear from front ends of the beams 14 and 16 and has opposite vertical ends 22 and 24, respectively engaged with, and secured, as by bolts 25, against outer faces of the beams. The rear bracket 20 is spaced forwardly from rear ends of the beams 14 and 16 and has opposite vertical ends 26 and 28 respectively engaged with, and secured, as by bolts 27 against, the outer faces of the beams 14 and 16.

Figure 3:
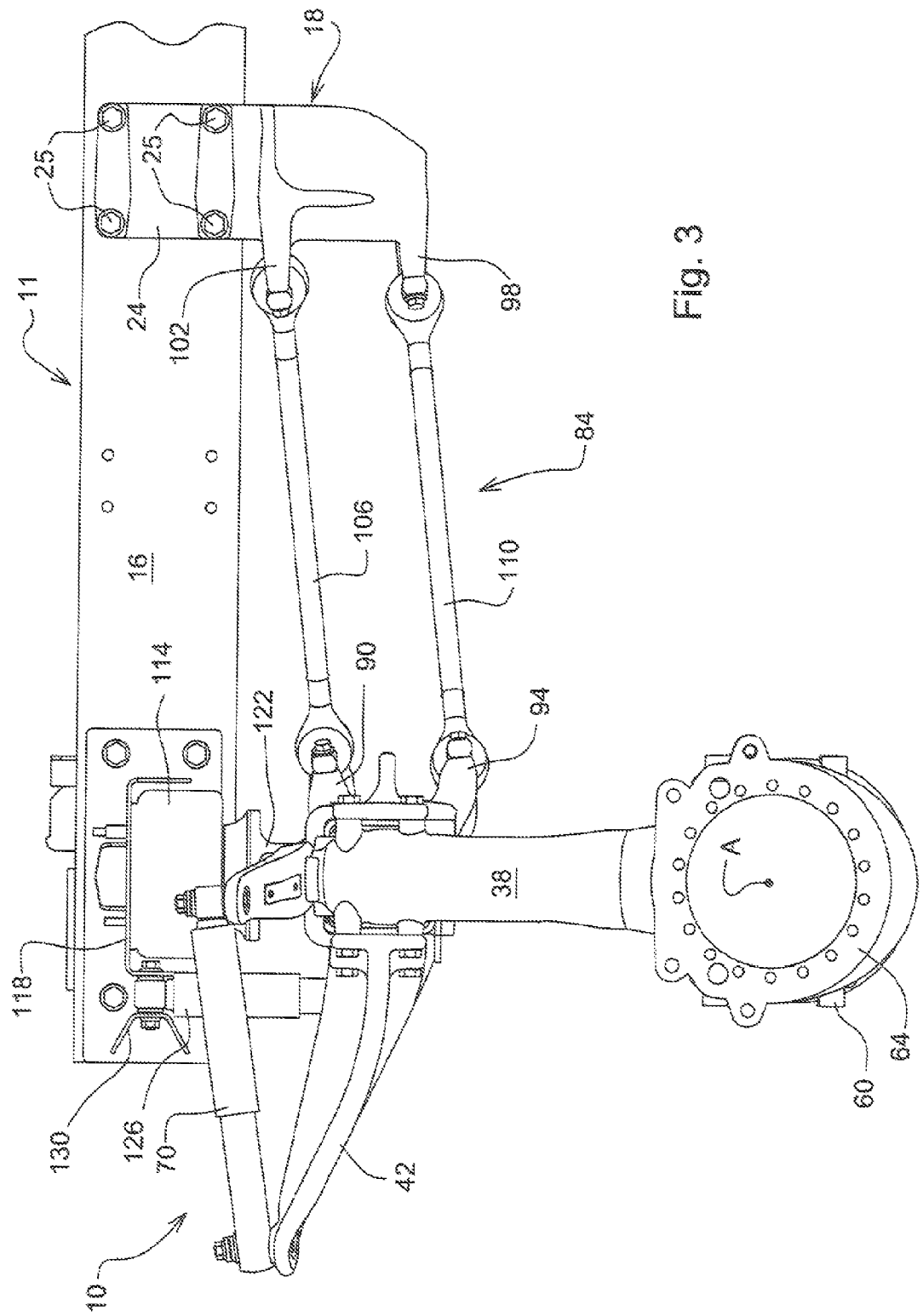
FIG. 3 is an enlarged view of a forward region of the vehicle frame and axle suspension shown in FIG. 2, but with the wheels removed.
Figure 4:
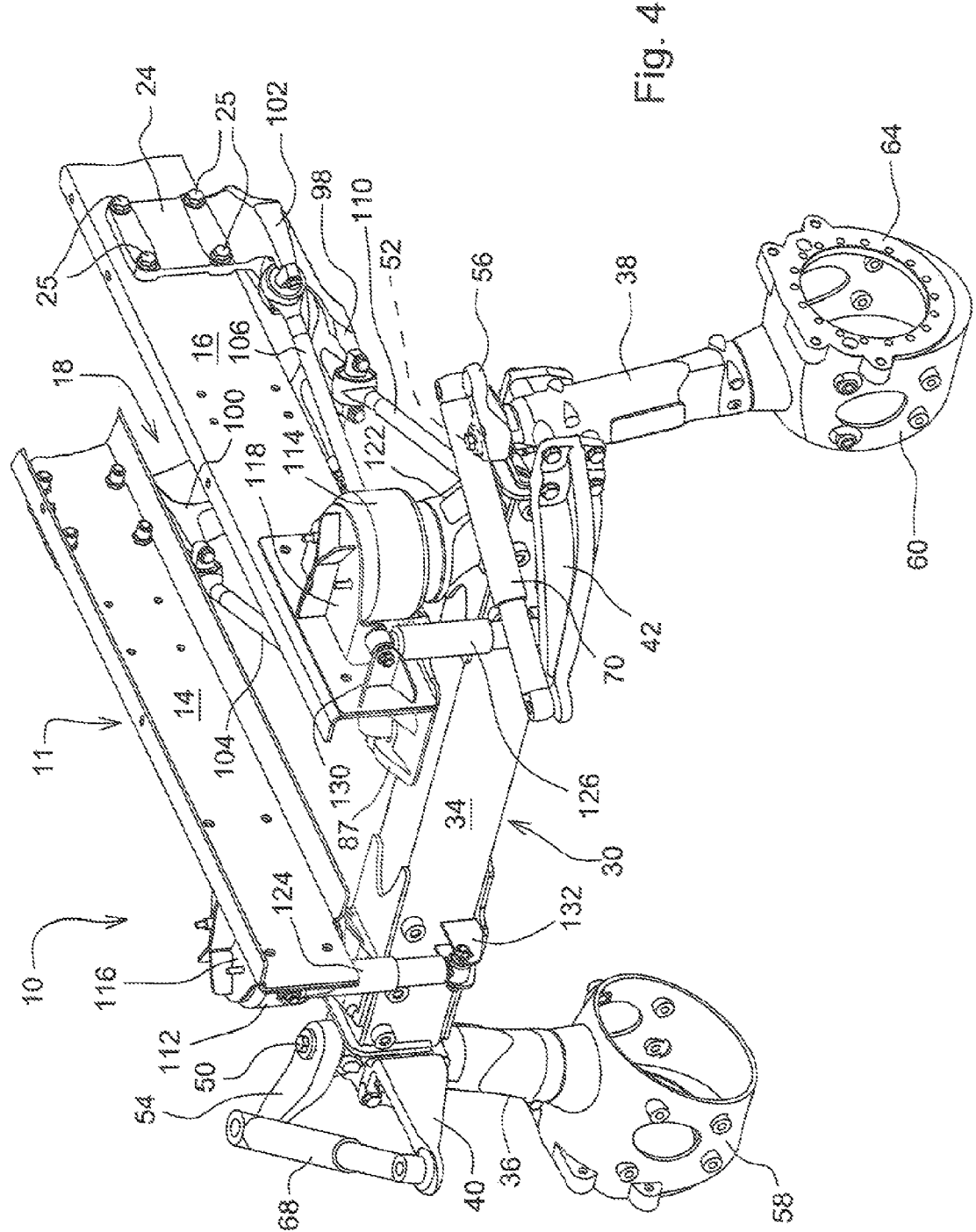
FIG. 4 is a left front perspective view of the forward region of the vehicle frame and axle suspension shown in FIG. 3.

Extending beneath each of front and rear end regions of, and disposed crosswise relative to, the parallel beams 14 and 16 are front and rear axles 30 and 32, respectively. Referring now also to FIGS. 3 and 4, it can be seen that the front axle 30 includes a main central section 34 defined by a tube having a square cross section. Joined in depending relationship to opposite ends of the central section 34 are right and left spindle housings, or drop knees 36 and 38, respectively, which are each inclined upwardly and inwardly at a relatively small angle to vertical. Fixed to, and respectively projecting forwardly from, upper end regions of the drop knees 36 and 38 are right and left steering cylinder mounting arms 40 and 42. Similarly, the rear axle 32 includes a main central section 44 defined by a tube having a square cross section. Joined in depending relationship to opposite ends of the central section 44 are right and left drop knees or spindle housings 46 and 48, respectively, which are each inclined upwardly and inwardly at a relatively small angle to vertical.

Right and left hand front spindles (not visible) are respectively mounted for oscillating in the drop knees 36 and 38. Upper ends of the spindles 50 and 52 project from tops of the drop knees 36 and 38, and are respectively coupled, as by cap screws 50 and 52, to right and left steering arms 54 and 56. Formed integrally with the bottom ends of the spindles are wheel support and motor housings 58 and 60, with a hydraulic wheel motor 62 being bolted to a mounting surface 64 of each of the housings 58 and 60 and being coupled, in a manner not shown, for driving the front wheels 12 about a rotation axis A located below the central section 34 of the front axle 30 by a distance approximately equal to that of the lengths of each of the drop knees 36 and 38, noting that tops of the drop knees are approximately even with a top surface of the axle central section 34. A right steering cylinder 68 is coupled between the right mounting arm 40 and the right steering arm 54, while a left steering cylinder 70 is coupled between the left mounting arm 42 and the left steering arm 56.

Mounted for oscillating in the drop knees 46 and 48 of the rear axle 32 are right and left rear spindles 72 and 74, respectively. Formed integrally with a bottom end of the spindles 72 and 74 are right and left wheel support and motor housings 76 and 78. A hydraulic drive motor 80 is bolted to an outwardly facing mounting surface (not shown) of each of the wheel support and motor housings 76 and 78, and is coupled for driving an associated one of the non-steerable rear wheels 13.

The front and rear axles 30 and 32 are respectively suspended from the main frame 11 by substantially identical front and rear suspension arrangements 84 and 86, which are mirror images of each other, with only the front suspension arrangement 84 being shown and described in detail for the sake of brevity.

The front suspension arrangement 84 comprises a middle suspension rod connection bracket 87 joined to, and projecting rearwardly from, an upper central location of the middle section 34 of the front axle 30 and including a pair of right and left, upper suspension rod mounts 88 and 90, respectively. Mounted to the axle middle section 34 at respective locations spaced equally to opposite sides of the connection bracket 87 are a right, lower suspension rod connection bracket including a right, lower suspension rod mount 92 and a left, lower suspension rod bracket including a left, lower suspension rod mount 94. As viewed from the top in FIG. 1, the lateral distance between the upper rod mounts 88 and 90 is substantially equal to the distance between the lower rod mounts 96 and 98; and the lateral distance between the lower rod mounts 92 and 94 is substantially equal to the distance between the upper rod mounts 100 and 102, with this distance being slightly greater than the distance between the outer surfaces of the parallel, fore-and-aft extending beams 14 and 16 of the sprayer main frame 11.

Joined to and projecting forwardly from a lower middle location of the front suspension rod mounting bracket 18 is a pair of right and left lower suspension rod connection mounts 96 and 98, respectively. Respectively joined to, and projecting forwardly from, upper right and left end locations of the bracket 18 are an upper pair of suspension rod connection mounts 100 and 102. As viewed from the top in FIG. 1, the spacing between the lower mounts 96 and 98 is substantially equal to the spacing between the right lower mount 96 and the right upper mount 100, and the spacing between the left lower mount 98 and the left upper mount 102.

An upper pair of right and left suspension rods 104 and 106 has forward ends respectively coupled to the upper pair of mounts 88 and 90, and has rear ends respectively coupled to the upper pair of mounts 100 and 102. Similarly, a lower pair of right and left suspension rods 108 and 110 has forward ends respectively coupled to the lower right and left suspension rod connection mounts 92 and 94, and has rear ends respectively coupled to the lower right and left suspension mounts 96 and 98. It is significant that the suspension rods 104, 106, 108 and 110 are identical to each other, this being made possible by the arrangement of the various described suspension rod mounts.

As viewed from the side in FIG. 3, the upper pair of suspension rods 104 and 106 is parallel to the lower pair of suspension rods 108 and 110. Thus the axle 30 and attached wheels 12 move substantially vertically during travel over uneven ground. In order to constrain sideways motion of the wheels 12 as they travel up and down, the right set of upper and lower suspension rods 104 and 108, as viewed from the top in FIG. 1, are arranged relative to each other so as to form an X, with the left set of upper and lower suspension rods 106 and 110 being arranged in a similar fashion.

Up and down motion of the front axle 30 is cushioned by right and left airbags 112 and 114, having upper ends respectively coupled to right and left horizontal mounting plates 116 and 118 respectively fixed to and projecting outwardly from forward end regions of outer faces of the right and left beams 14 and 16; and having lower ends respectively coupled to right and left airbag connection by left and right airbag connection brackets (only left hand bracket 122 is visible) respectively projecting upwardly from right and left end regions of the central section 34 of the front axle 30. Further cushioning of up and down movement of the axle 30 is provided in conjunction with that afforded by the airbags 112 and 114 by right and left shock absorbers 124 and 126 having respective upper ends coupled to right and left upper mounts 128 and 130, respectively fixed to and projecting outwardly from the beams 14 and 16 at locations just forward of the airbag mounting plates 116 and 118, and having respective lower ends coupled to right and left lower mounts (only the right mount 132 is visible) respectively fixed to lower front locations, of the central axle section 34, which are in approximate vertical alignment with the upper mounts 128 and 130.

Up and down motion of the rear axle 32 is similarly cushioned by right and left rear airbags and right and left rear shock absorbers, with the drawings having only a clear showing of a left airbag 134 and a left shock absorber 136 (see FIG. 2).

It will be appreciated then that the suspended front and rear axles 30 and 32 permit vertical movement of the axles making it unnecessary to provide expensive chrome spindles as are needed with the fixed axle design disclosed in the aforementioned U.S. Pat. No. 7,168,717. Further, it will be appreciated that by arranging the side-by-side sets of upper and lower suspension rods so that the upper and lower suspension rods of each set are parallel to each other, as viewed from the side, and form an X, as viewed from the top, a substantially straight line or vertical up and down movement of the axle occurs which eliminates the arc motion generated from lateral stabilizer bars used in prior art suspensions, thus eliminating tracking issues that occur when the axle swings in an arc about the attachment points of the lateral stabilizer bar. Additionally, due to the front and rear suspension rod mounting brackets 18 and 20 each being fixed between the frame beams 14 and 16, a robust connection is made with the suspension rods respectively of the front and rear suspension arrangements 84 and 86, respectively, so as to absorb the moment loads generated due to forces imposed on the wheels acting through the large offset from the rotation axes of the front and rear sets of ground wheels 12 and 13, respectively, to the central sections of the front and rear axles to which the suspension rods are mounted.

While two pair of upper and lower suspension rods are used for each axle, it is noted that for some applications a single pair might provide an adequate axle suspension.

Having described the preferred embodiment, it will become apparent that various modifications can be made without departing from the scope of the invention as defined in the accompanying claims.

The invention claimed is:

1. In a self-propelled agricultural sprayer including a main frame defined in part by right- and left-hand, fore-and aft extending, parallel beams, front and rear axles extending beneath the main frame and each axle including a main central section extending between and joined to right- and left-hand upright drop knees, a spindle being received in each drop knee and having a lower end joined to a wheel mount, and a wheel being mounted on each wheel mount and having a rotation axis spaced below an adjacent one of said drop knees, the improvement comprising: front and rear suspension arrangements respectively coupled between said central section of said front and rear axles and said main frame and respectively including front and rear suspension rod mounting brackets extending between, and having opposite ends respectively fixed to, said parallel beams; said front and rear suspension rod mounting brackets each including a first pair of rod mounts disposed in spaced, side-by-side relationship to each other at a respective region of said mounting brackets centered between said beams, and a second pair of rod mounts respectively located adjacent opposite ends of said rod mounting brackets, with said first and second pairs of rod mounts respectively being located at different heights relative to each other; said central sections of each of said front and rear axles including a third pair of rod mounts being mounted in spaced side-by-side relationship to a region centered between opposite ends of said each axle, and a fourth pair of rod mounts being mounted to each axle central section at respective locations in fore-and-aft alignment with each second pair of rod mounts, with said third and fourth pairs of rod mounts respectively being at different heights relative to each other and having a vertical spacing from each other equal to a vertical spacing of said first and second pairs of rod mounts from each other; front and rear pairs of upper suspension rods each having first ends respectively connected to upper ones of said first and second pairs of rod mounts of the front and rear rod mounting brackets, and having second ends respectively connected to upper ones of said third and fourth pairs of rod mounts of the front and rear axles; and front and rear pairs of lower rods having first ends respectively connected to lower ones of said first and second pairs of rod mounts of said front and rear rod mounting brackets, and having second ends respectively connected to lower ones of said third and fourth pairs of rod mounts of the front and rear axles, with said front and rear pairs of upper suspension rods being so disposed relative to said front and rear pairs of lower suspension rods that, when viewed from the top, each suspension rod of said upper front and rear pairs of suspension rods, respectively cooperates with each suspension rod of said lower front and rear pairs of suspension rods to define an X and when viewed from the side, being parallel with each other.

2. The agricultural sprayer, as defined in claim 1, wherein said front and rear suspension rod mounting brackets are U-shaped, with said first pair of suspension rod mounts of each mounting bracket being located at a bottom region of the U, and with said second pair of suspension rod mounts being respectively located at upper locations of opposite sides of the U.

3. The agricultural sprayer, as defined in claim 1, wherein said third pair of suspension rod mounts of each of said front and rear axles is located at a height above said fourth pair of suspension rod mounts of each of said front and rear axles.

4. The agricultural sprayer, as defined in claim 1, wherein said suspension rods of said front and rear suspension arrangements are identical.

5. The agricultural sprayer, as defined in claim 1, wherein said front and rear suspension arrangements are identical and are respectively arranged in mirror image relationship to each other relative to a vertical, transverse plane located midway between front and rear ends of said parallel beams.

* * * * *